UNITED STATES PATENT OFFICE.

WILLIAM C. MOOR, OF FORT WORTH, TEXAS, ASSIGNOR TO ARMOUR AND COMPANY, OF CHICAGO, ILLINOIS, A CORPORATION OF ILLINOIS.

ACTIVATED-SLUDGE TREATMENT.

1,254,833.  Specification of Letters Patent.  Patented Jan. 29, 1918.

No Drawing.  Application filed July 9, 1917. Serial No. 179,499

*To all whom it may concern:*

Be it known that I, WILLIAM C. MOOR, a citizen of the United States, residing at Fort Worth, in the county of Tarrant and State of Texas, have invented certain new and useful Improvements in Activated-Sludge Treatment, of which the following is a specification.

The activated sludge method of sewage disposal, though of comparatively modern origin and in its infancy, is one which is well known and constitutes a field of activity for sanitary engineers in the effort to surmount present difficulties in its application to a wider range of usefulness and in experimentation to increase its efficiency and economical availability.

Briefly and generally stated, the activated sludge treatment of sewage consists in conducting the raw sewage into and through aerating tanks provided with means for the introduction of air under pressure to the bottom of the tank, whereby the air is caused to bubble up through the liquid sewage. The passage of the air through the sewage develops in time microscopic aerobic organisms which in the course of their growth or by means of conditions provided by their growth, oxidize the collodial and soluble solids in the sewage causing them to separate out as flocculent particles. The treated sewage, at the proper stage is run into a settling tank where it is allowed to remain quiescent for from thirty minutes to one hour, and the solids settle to the bottom as a flocculent ooze, called activated sludge.

The remaining liquid content of the sewage is rendered perfectly clear, white and odorless. This affluent liquid may then be run off through the sewers to rivers or other natural channels without injury to fish or menace to the health or comfort of people living adjacent thereto.

The activated sludge is removed from the bottom of the tank, to be freed of its water content, and when dried is available as a fertilizer, containing a large percentage of ammonia compounds and being practically free from any offensive odors.

To make the process continuous and in order to hasten the treatment of the raw sewage, it is found advantageous to inoculate the same upon its introduction to the aerating tanks with activated sludge from sewage previously treated, whereby the process is reduced in point of time from several days to a few hours.

The de-hydration of the sludge resulting from this activated sludge method of sewage disposal, is the most discouraging problem encountered in the practical employment of that method of treating industrial sewage.

Activated sludge, by reason of its physical and chemical characteristics, is a most valuable fertilizer, but the economical utilization of the sludge has not thus far been possible owing to the fact that as found in the settling tank the sludge is light and flaky, has a specific gravity of about 1.02, and when siphoned off averages 99.5% of water. By subjecting the withdrawn sludge to a further settling for from four to six hours, the water content can be reduced to 99 per cent., but prolonged settling is inhibited owing to the fact that the sludge becomes septic if maintained too long without air, the cutting off of the air supply permitting the renewed growth of the anaerobic organisms and their domination of the gradually weakening aerobic organisms.

For the further de-hydrating of the sludge, extensive experiments have been made along the lines of centrifuging, filter pressing and drying, but none of these have proven satisfactory, being uneconomical by reason of the time required and high cost of installation required for the purpose.

By the present invention, the activated sludge, which is different from ordinary sewage sludge by reason of the fact that it has as part of its content precipitated colloids and large numbers of aerobic organisms and which sludge has been recovered from sewage quite alkaline in nature or which has been made alkaline, is withdrawn from the settling chamber and heated to a temperature of from 30° C. to 40° C. It is then treated with an acid such as sulfuric acid, in amount about four times that required to neutralize the sludge, and accompanied by thorough gaseous agitation, preferably by means of air, although steam may be advantageously used in some cases. The acid treatment results in coagulating the sludge and producing gases, chiefly carbon dioxid, which causes the sludge to first rise to the surface and then settle, thereby permitting the easy withdrawal of the remaining liquid, whereby the total volume of sludge to be handled is decreased by about 90 per cent.

and the moisture content of the sludge reduced to such an extent that it can be readily removed as a rubbery mass, drained and dried.

The treatment of the sludge by the acid as above described, also fixes any volatile or easily decomposed nitrogen compounds that are otherwise certain to be driven off during the drying process. This action of the acid in fixing the ammonia content of the sludge is important, as in its original condition much of the ammonia is volatile, and if the sludge be dried without applying the acid treatment this volatile ammonia is likely to be lost, thus depriving the fertilizer of its most valuable constituent.

It will thus be seen that I have, by the present process, achieved a decided advance in the activated sludge method of sewage disposal, in that the sludge is made readily available as a fertilizer, the return from which is more than sufficient to cover the entire cost of the sewage treatment, whereas heretofore the sludge has not been economically available for this purpose by reason of the expense and difficulty of de-hydrating the same.

I claim:

1. The method of de-hydrating activated sludge which consists in heating the same above thirty degrees Centigrade, then subjecting the same to the action of an acid whereby coagulation takes place, and then separating the coagulated sludge from the liquid.

2. The method of de-hydrating activated sludge which consists in subjecting the same to the simultaneous action of an acid and to agitation by means of a gas introduced thereto whereby coagulation takes place, then separating the coagulated sludge from the liquid, and drying.

3. The method of de-hydrating activated sludge which consists in subjecting the same to the simultaneous action of an acid and to agitation by means of air whereby coagulation takes place, then separating the coagulated sludge from the liquid, and drying.

4. The method of de-hydrating activated sludge which consists in subjecting the same to the action of sulfuric acid whereby coagulation takes place accompanied by the generation of gases and the coagulated sludge is caused to float, and then separating the coagulated floating sludge from the liquid.

5. The method of de-hydrating activated sludge which consists in heating the same above 30° C., then subjecting the same to the action of sulfuric acid whereby coagulation takes place accompanied by the generation of gas therein and the coagulated sludge is caused to float, and then separating the coagulated floating sludge from the liquid, and drying.

6. The method of de-hydrating activated sludge which consists in heating the same above 30° C., then subjecting the same to the action of sulfuric acid and agitation by means of air whereby coagulation takes place accompanied by the generation of gas therein and the coagulated sludge is caused to float, and then separating the coagulated floating sludge from the liquid, and drying.

WILLIAM C. MOOR.

Witnesses:
A. B. STRATTON,
E. G. McDONALD.